(12) United States Patent
Zhai et al.

(10) Patent No.: US 9,063,949 B2
(45) Date of Patent: Jun. 23, 2015

(54) INFERRING A SEQUENCE OF EDITING OPERATIONS TO FACILITATE MERGING VERSIONS OF A SHARED DOCUMENT

(71) Applicant: Dropbox, Inc., San Francisco, CA (US)

(72) Inventors: Alex Zhai, San Francisco, CA (US); Rian Hunter, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 164 days.

(21) Appl. No.: 13/801,303

(22) Filed: Mar. 13, 2013

(65) Prior Publication Data
US 2014/0279842 A1    Sep. 18, 2014

(51) Int. Cl.
*G06F 17/30*    (2006.01)
*G06F 17/22*    (2006.01)

(52) U.S. Cl.
CPC ...... *G06F 17/3023* (2013.01); *G06F 17/30168* (2013.01); *G06F 17/2288* (2013.01)

(58) Field of Classification Search
CPC ............................ G06F 17/2288; G06Q 10/10
See application file for complete search history.

(56) References Cited

U.S. PATENT DOCUMENTS

| 6,260,042 B1 * | 7/2001 | Curbera et al. ........................ 1/1 |
| 7,899,883 B2 | 3/2011 | Rasmussen et al. |
| 8,244,046 B2 | 8/2012 | Takahashi et al. |
| 2002/0083079 A1 * | 6/2002 | Meier et al. ................. 707/104.1 |
| 2006/0098899 A1 * | 5/2006 | King et al. ..................... 382/305 |
| 2007/0294612 A1 * | 12/2007 | Drucker et al. ............ 715/500.1 |
| 2011/0289405 A1 | 11/2011 | Fritsch et al. |

OTHER PUBLICATIONS

Towards Collaborative Editing of Structure Data on Mobile Devices, Nicholas Palmer, Emilian Miron, Roelof Kemp, Thilo Kielmann, Henri Bal, Vrije Universiteit, Amsterdam, The Netherlands.
Operational transformation from Wikipedia.

* cited by examiner

*Primary Examiner* — Sherief Badawi
*Assistant Examiner* — Courtney Harmon
(74) *Attorney, Agent, or Firm* — Park, Vaughan, Fleming & Dowler LLP (57) ABSTRACT

The disclosed embodiments relate to a system that infers a sequence of editing operations that were applied to a document to produce an updated version of the document. During operation, the system computes a minimum edit distance between the document and the updated version of the document. During this process, the system associates a block cost with each contiguous block of characters that is changed by an editing operation and also a character cost with each character that is changed. Next, the system uses information stored during the computation to determine the sequence of editing operations which were used to achieve the minimum edit distance. The system communicates the sequence of editing operations to a remote computing device, wherein the remote computing device uses an operational transformation technique to transform the sequence of editing operations before applying the transformed sequence of editing operations to a remote version of the document.

27 Claims, 3 Drawing Sheets

```
const int INT_MAX = (1 << 30);
const int N_MAX = 100;
const int BLOCK_COST = 5;
const int CHAR_COST = 1;
struct Cost {
  Cost(int ins = INT_MAX, int del = INT_MAX, int match = 0)
  : ins_cost(ins), del_cost(del), match_cost(match) {}
  int ins_cost; // min cost if last operation is insert
  int del_cost; // min cost if last operation is delete
  int match_cost; // min cost if last operation is match
  int cost() {
    return min(min(ins_cost, del_cost), match_cost);
  }
};

bool computed[N_MAX][N_MAX];
Cost costs[N_MAX][N_MAX];

string s1, s2;

Cost get_cost(int n, int m) {
  if (n < 0 || m < 0) return Cost(INT_MAX, INT_MAX, INT_MAX);
  if (n == 0 && m == 0) return Cost(INT_MAX, INT_MAX, 0);
  if (!computed[n][m]) {
    computed[n][m] = true;
    if (n > 0 && m > 0 && s1[n - 1] == s2[m - 1])
      costs[n][m].match_cost = get_cost(n - 1, m - 1).cost();
    else
      costs[n][m].match_cost = INT_MAX;
    costs[n][m].ins_cost = min(get_cost(n, m - 1).ins_cost + CHAR_COST,
      get_cost(n, m - 1).cost() + BLOCK_COST + CHAR_COST);
    costs[n][m].del_cost = min(get_cost(n - 1, m).del_cost + CHAR_COST,
      get_cost(n - 1, m).cost() + BLOCK_COST + CHAR_COST);
  }
  return costs[n][m];
}
int main() {
  cin >> s1 >> s2;
  for (int i = 0; i <= s1.length(); i++) {
    for (int j = 0; j <= s2.length(); j++) computed[i][j] = false;
  }
  cout << "Min edit distance is:" << get_cost(s1.length(),
    s2.length()).cost() << endl;
}
```

```
const int INT_MAX = (1 << 30);
const int N_MAX = 100;
const int BLOCK_COST = 5;
const int CHAR_COST = 1;
struct Cost {
  Cost(int ins = INT_MAX, int del = INT_MAX, int match = 0)
    : ins_cost(ins), del_cost(del), match_cost(match) {}
  int ins_cost; // min cost if last operation is insert
  int del_cost; // min cost if last operation is delete
  int match_cost; // min cost if last operation is match
  int cost() {
    return min(min(ins_cost, del_cost), match_cost);
  }
};

bool computed[N_MAX][N_MAX];
Cost costs[N_MAX][N_MAX];

string s1, s2;

Cost get_cost(int n, int m) {
  if (n < 0 || m < 0) return Cost(INT_MAX, INT_MAX, INT_MAX);
  if (n == 0 && m == 0) return Cost(INT_MAX, INT_MAX, 0);
  if (!computed[n][m]) {
    computed[n][m] = true;
    if (n > 0 && m > 0 && s1[n - 1] == s2[m - 1])
      costs[n][m].match_cost = get_cost(n - 1, m - 1).cost();
    else
      costs[n][m].match_cost = INT_MAX;
    costs[n][m].ins_cost = min(get_cost(n, m - 1).ins_cost + CHAR_COST,
    get_cost(n, m - 1).cost() + BLOCK_COST + CHAR_COST);
    costs[n][m].del_cost = min(get_cost(n - 1, m).del_cost + CHAR_COST,
    get_cost(n - 1, m).cost() + BLOCK_COST + CHAR_COST);
  }
  return costs[n][m];
}
int main() {
  cin >> s1 >> s2;
  for (int i = 0; i <= s1.length(); i++) {
    for (int j = 0; j <= s2.length(); j++) computed[i][j] = false;
  }
  cout << "Min edit distance is:" << get_cost(s1.length(),
    s2.length()).cost() << endl;
}
```

FIG. 3

INFERRING A SEQUENCE OF EDITING OPERATIONS TO FACILITATE MERGING VERSIONS OF A SHARED DOCUMENT

BACKGROUND

1. Field

The disclosed embodiments generally relate to systems that facilitate collaborative editing of documents. More specifically, the disclosed embodiments relate to techniques for inferring a sequence of editing operations to facilitate merging different versions of a shared document.

2. Related Art

Recently developed document-sharing systems presently make it possible for multiple users working from different locations to concurrently edit the same shared document. Many of these document-sharing systems provide a replicated storage architecture, wherein shared documents are replicated in the local storage of each collaborating site to provide adequate responsiveness through potentially high-latency networks, such as the Internet. However, allowing users to concurrently edit different versions of the same shared document can cause consistency problems among the different document versions.

These consistency problems can be dealt with through techniques such as Operational Transformation (OT). In a typical OT system, editing operations performed on a local version of a shared document are immediately propagated to remote versions of the shared document located at remote sites. Moreover, editing operations received from remote sites are first transformed before being applied to the local version of the document. This transformation makes use of the "operational intent" of the user to determine how concurrent edits from multiple users are applied to the document.

Unfortunately, it is hard to determine the operational intent of a user by merely examining a document. A word-processing system typically updates the document during periodic save operations. However, between two consecutive save operations potentially hundreds of editing operations may have been applied to the document. Moreover, the documents typically do not provide details about the specific sequence of editing operations which occurred between the save operations; only the final result of the sequence of editing operations is visible. This makes it hard to determine the operational intent of the user in order to resolve the above-described consistency problems between different versions of a shared document.

SUMMARY

The disclosed embodiments relate to a system that infers a sequence of editing operations that were applied to a document to produce an updated version of the document. During operation, the system computes a minimum edit distance between the document and the updated version of the document. During this process, the system associates a block cost with each contiguous block of characters that is changed by an editing operation and also a character cost with each character that is changed. Next, the system uses information stored during the computation to determine the sequence of editing operations which were used to achieve the minimum edit distance. Finally, the system communicates the sequence of editing operations to a remote computing device, wherein the remote computing device uses an operational transformation technique to transform the sequence of editing operations before applying the transformed sequence of editing operations to a remote version of the document.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

Existing techniques for determining changes between documents typically determine a minimum edit distance between the documents. However, a minimum edit distance is character based and does not reflect how a user would actually have changed the document. Users tend to perform editing operations on blocks of characters, such as words, sentence fragments and paragraphs, instead of making numerous single-character edits. Hence, it is desirable to be able to determine how the user would make such block-oriented edits between successive versions of a document.

Content Management Environment

Figure 1:
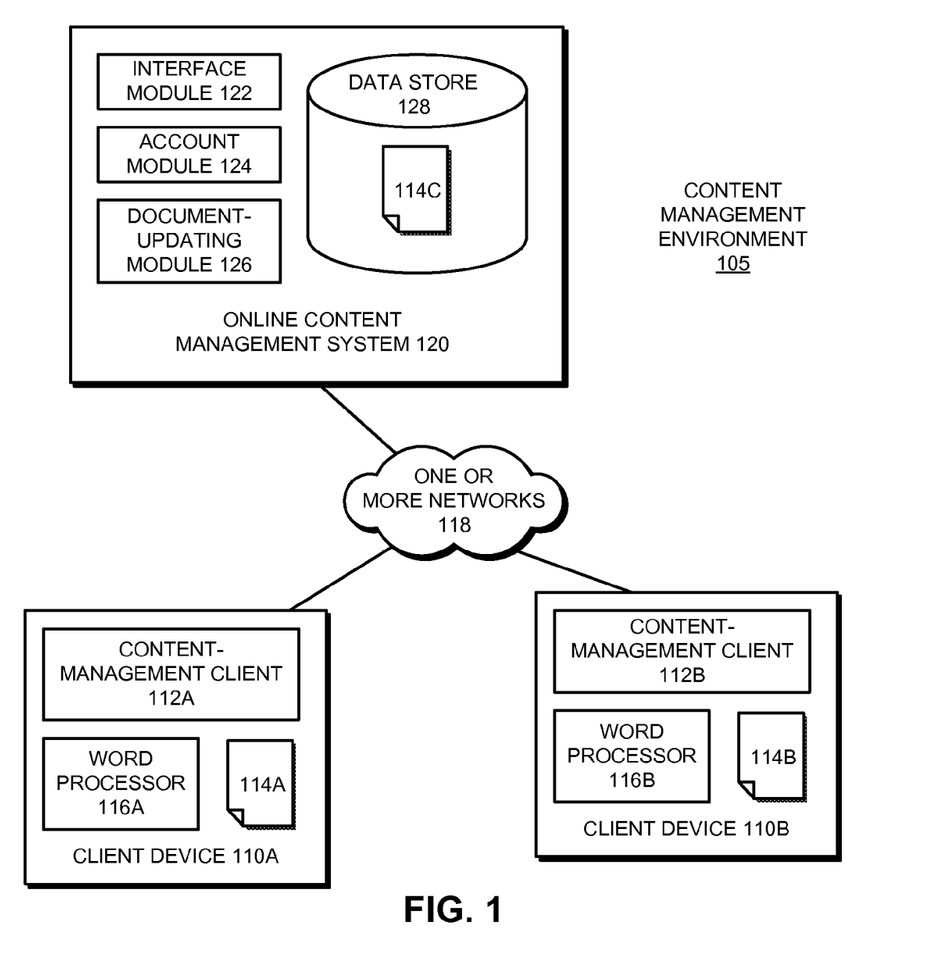
FIG. 1 illustrates a content management environment in accordance with the disclosed embodiments.

FIG. 1 illustrates content management environment 105 according to various embodiments. As may be understood from this figure, content management environment 105 includes a plurality of client devices 110A and 110B (collectively 110) and an online content management system 120 (also referred to as a "content management system"), which are interconnected by one or more networks 118. Various aspects of the client devices 110 and online content management system 120 are discussed below.

Client Devices

In various embodiments, each client device 110 may selectively execute a content-management client application 112A and 112B (collectively 112) (also referred to as a "content-management client"), which may be used to access content items stored within a content management system 120. In some embodiments, synchronized copies of a content item 114A, 114B and 114C are maintained on clients 110A, 110B and content management system 120, respectively. (Note that a "content item" can include a file, a folder, a set of folders, or any other type of data object.) In some embodiments, client devices 110 may provide a file-browser type interface (not shown) for directly manipulating the content items stored on content management system 120 without maintaining a local copy. Client devices 110 may also include word processors 116A and 116B (collectively 116) for editing documents, such as the documents contained in content items 114A and 114B.

While only two client devices 110A and 110B are shown in FIG. 1 for purposes of clarity, it should be understood by those skilled in the art that many client devices 110A and 110B may simultaneously connect through network(s) 118 to content management system 120 at any given time. Examples of suitable client devices 110 include, but are not limited to, a desktop computer; mobile computing devices, such as a laptop or a tablet; and handheld devices, such as a smartphone (e.g., an IPHONE®, BLACKBERRY®, or ANDROID™-based smartphone). Each client device 110 may store a local, synced copy of one or more content items from within content management system 120, and the content items may be stored in any suitable format. When content-management client 112 presents content items that are stored within the online content management system to a user, the content items may be arranged in folders and the folders themselves may be arranged in other folders, or in any other arbitrary arrangement supported by content management system 120, as determined by the user. However, one of skill in the art should understand in light of this disclosure that each user's content item storage architecture may be considerably different from the next, and in some instances, the content item storage architecture may be implemented to maximize storage and content item retrieval efficiency.

Content Management System

Content management system 120 stores content items and manages access to those content items via client devices 110. Content management system 120 and its components may be implemented using any appropriate hardware and software for file serving, storage, and retrieval functions. For example, content management system 120 may be implemented in the form of a single server or multiple servers.

In various embodiments, content management system 120 includes interface module 122, account module 124, document-updating module 126, and data store 128. Some of the elements of content management system 120 are discussed below.

Content Management System—Interface Module

In particular embodiments, interface module 122 may facilitate content item access and content item storage operations among content management system 120 and client devices 110. Interface module 122 may receive content items from and send content items to client devices 110 consistent with the user's preferences for sharing content items. Interface module 122 may act as the counterpart to a client-side file-explorer style user interface that allows a user to manipulate content items directly stored on content management system 120. In some embodiments, software operating on client devices 110 may integrate network-stored content items with the client's local file system to enable a user to manipulate network-stored content items through the same user interface (UI) used to manipulate content items on the local file system, e.g., via a file explorer, file finder or browser application. As an alternative or supplement to the client-side file-explorer interface, interface module 122 may provide a web interface for client devices 110 to access (e.g., via a word processor 116) and allow a user to manipulate content items stored within content management system 120. In this way, the user can directly manipulate content items stored within content management system 120.

Content Management System—Data Store

In various embodiments, data store 128 may store content items such as those uploaded using client devices 110, or using any other suitable computing device. In the embodiment illustrated in FIG. 1, client device 110A, which is associated with a first user, is shown as locally storing at least one content item 114A, and client device 110B, which is associated with a second user, is shown as locally storing at least one content item 114B. As shown in FIG. 1, a copy of the locally stored content item 114C is maintained in data store 128 of content management system 120. In the embodiment illustrated in FIG. 1, content items 114A, 114B and 114C are local versions of the same shared document which reside on client devices 110A, 110B and online content management system 120, respectively. Note that client devices 110A and 110B may also store other content items which are replicated on online content management system 120, but which are not shared with other client devices.

In various embodiments, data store 128 may maintain information identifying the user, information describing the user's file directory, and other information in a file journal that is maintained for each user. In some embodiments, the file journal may be maintained on content management system 120, and in other embodiments, a file journal (e.g., a "server-side file journal") may be maintained on both content management system 120 and locally on each client device 110. In various embodiments, the file journal may be used to facilitate the synchronization of the various copies of a particular content item that are associated with a user's account.

As a particular example, in the embodiment shown in FIG. 1, the system may be configured so that any changes that are made to content item 114A on particular client device 110A may also be automatically reflected in the copy of content item 114C stored within content management system 120 and the copy of the content item 114B on client device 110B. Similarly, any changes that are made to content item 114C on content management system 120 may also be automatically reflected in the copy of content item 114A stored on client device 110A, and the copy of the content item 114B on client device 110B.

Content Management System—Account Module

In particular embodiments, account module 124 may track content items stored in data store 128 and entries in the server-side file journal for each content item. As users grant content item access permissions to other users, account module 124 may update the server-side file journal associated with each relevant user in data store 128. Account module 124 may also track client devices 110 that are associated with each user's account. For example, a user may want to share all their content items between their desktop computer, tablet computer, and mobile device. To make such a sharing arrangement seamless to the user, the user's single account on content management system 120 may be associated with each of the user's respective client devices. In some embodiments, an application running on each respective client device 110 may help to coordinate synchronization of content items on the client device with corresponding versions of the content items within the user's account in content management system 120, and also with corresponding versions of the content items stored on the user's various other client devices.

Content Management System—Document-Updating Module

In particular embodiments, document-updating module 126 is configured to maintain consistency among different copies (versions) of a content item 114A, 114B and 114C, which are located in client device 110A, client device 110B and online content management system 120, respectively. As mentioned above, this can be accomplished using an "operational transformation" technique, wherein editing operations which are performed on a local version of a document are immediately propagated to remote versions of the document located at remote sites, and editing operations received from remote versions of the document are first transformed before being applied to the local version of the document.

For example, when a user of client device 110A makes changes to document 114A using word processor 116A, these changes become visible to content-management client 112A when the content item containing document 114A is "saved" by word processor 116A to the content item 114A. However, as mentioned above, between any two consecutive save operations potentially hundreds of editing operations may have been applied to the document. Moreover, documents 114A, 114B and 114C do not provide details about the specific sequence of editing operations which occurred between consecutive save operations.

Hence, in order to use an operational transformation technique to propagate changes to a document, the system must first determine the sequence of editing operations that were used to make the changes. This can be accomplished by performing a special type of minimum edit distance computation between two versions of the document which accounts for block-oriented editing operations as described in more detail below with reference to FIGS. 2 and 3.

Determining a Minimum Edit Distance and Associated Editing Operations

Figure 2:
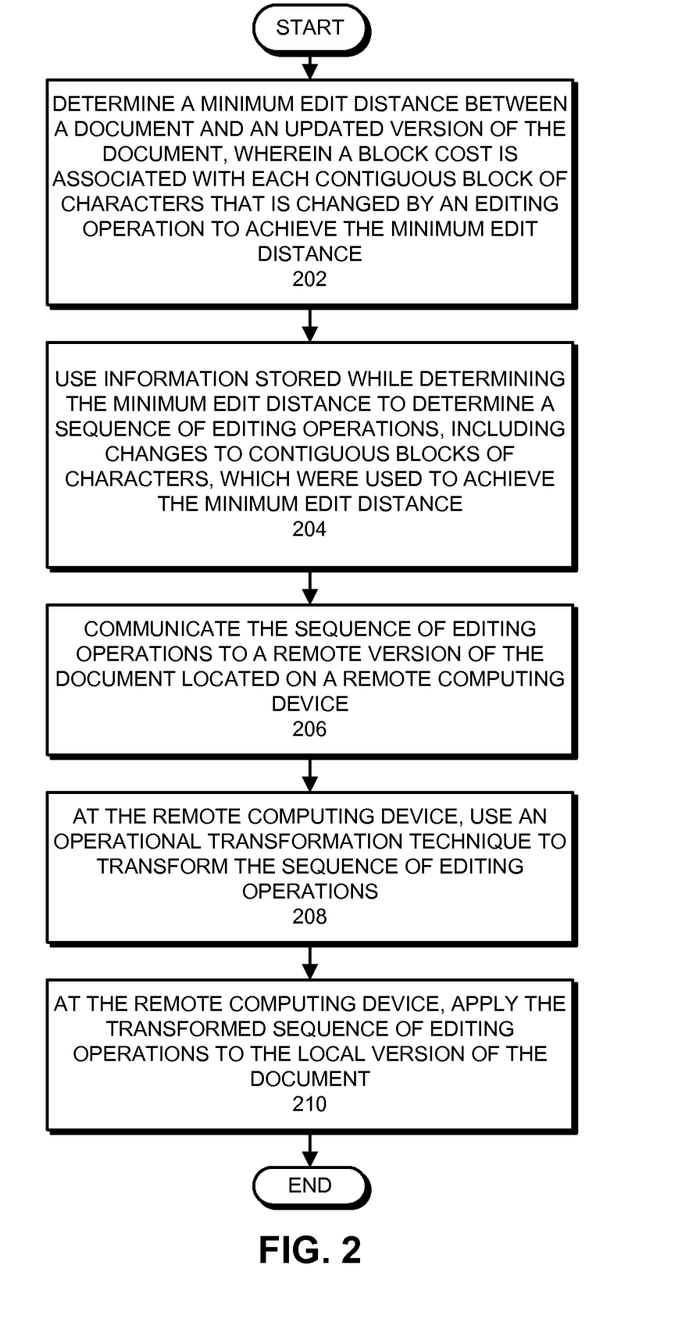
FIG. 2 presents a flow chart illustrating the process of determining a minimum edit distance and associated sequence of editing operations in accordance with the disclosed embodiments.

FIG. 2 presents a flow chart illustrating the process of determining a minimum edit distance between two consecutive versions of a document as well as an associated sequence of editing operations in accordance with the disclosed embodiments. First, the system determines the minimum edit distance between the document and an updated version of the document, wherein a block cost is associated with each contiguous block of characters that is changed by an editing operation to achieve the minimum edit distance (step 202). Next, the system uses information stored while determining the minimum edit distance to determine the sequence of editing operations, including changes to contiguous blocks of characters, which were used to achieve the minimum edit distance (step 204). A number of techniques can be used to determine this sequence of editing operations by examining data structures maintained during the minimum distance computation. Some of these techniques are discussed in more detail below with reference to FIG. 3.

Next, the system communicates the determined sequence of editing operations to a remote version of the document located on a remote computing device (step 206). The remote computing device uses an operational transformation technique to transform the sequence of editing operations (step 208). A large number of different operational transformation techniques have been developed over the past 25 years, and the disclosed embodiments can generally use any of these techniques. (For example, see Ellis, C. A., Gibbs, S. J. (1989), "Concurrency Control in Groupware Systems," *ACM SIGMOD Record* 18 (2): 399-407.)

Finally, the remote computing device applies the transformed sequence of editing operations to the remote version of the document (step 210).

Exemplary Computation

Figure 3:
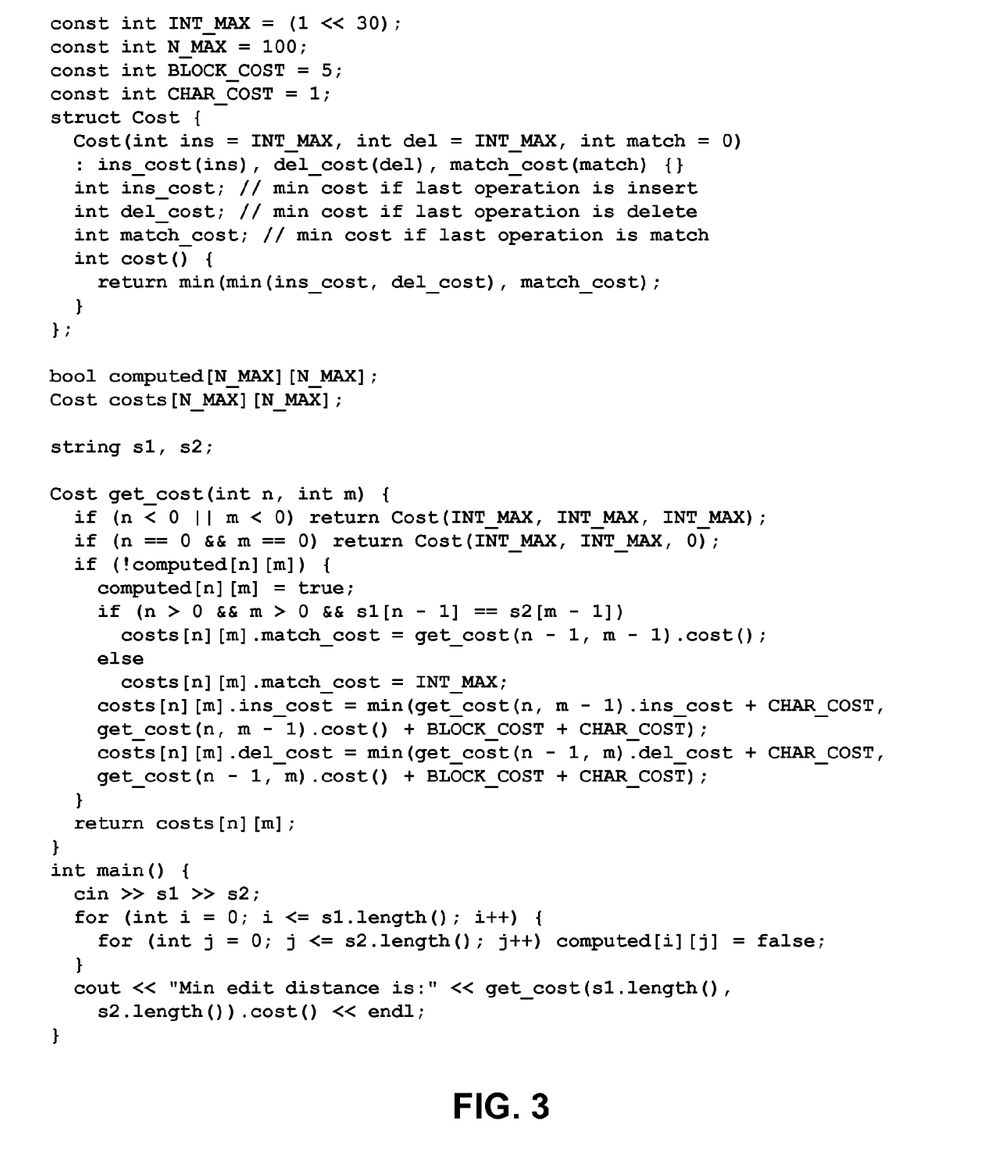
FIG. 3 presents exemplary code that performs a minimum edit distance computation in accordance with the disclosed embodiments.

FIG. 3 presents exemplary code that uses a dynamic-programming technique to perform a minimum edit distance computation in accordance with the disclosed embodiments. Unlike a conventional minimum edit distance computation, which counts the number of single-character edits between two documents, this new code associates a "block cost" with each contiguous block of characters that is changed by an editing operation. Hence, the resulting sequence of editing operations is more likely to reflect how a user would actually edit the document, because users typically manipulate blocks of characters, such as words, sentence fragments or paragraphs, instead of manipulating individual characters.

The dynamic-programming code illustrated in FIG. 3 computes a minimum edit distance between a string s1 of length s1.length( ) and a string s2 of length s2.length( ) wherein the strings s1 and s2 are assumed to contain different versions of the same document.

The dynamic-programming code maintains a two-dimensional array called "costs," wherein a given entry in costs[n][m] stores minimum edit distances between a prefix of s1 of length n and a prefix of s2 of length m. Moreover, each entry in costs[n][m] includes the following integers: (1) ins_cost—a minimum cost for the case where the last operation was an insertion; (2) del_cost—a minimum cost for the case where the last operation was a deletion; and (3) match_cost—a minimum cost for the case where the last operation was a match. Also, the array is associated with a function cost( ) which returns the minimum of ins_cost, del_cost and match_ cost for a given entry. The code also maintains a two-dimensional array called "computed," wherein each entry computed[n][m] stores a binary value indicating whether the corresponding entry costs[n][m] has already been computed. The code also defines a BLOCK_COST=5 which provides a cost for each block of characters that is inserted or deleted, and also a character cost CHAR COST=1 for each individual character that is inserted or deleted.

During operation, the dynamic-programming technique fills in the costs array by computing minimum edit distances between progressively larger prefixes of s1 and s2 until the minimum edit distance between s1 and s2 is ultimately computed. A given entry costs[n][m] is computed as follows.

1. If the last characters in each string s1 and s2 match, cost[n][m].match_cost is set to the minimum cost of the entry costs[n−1][m−1]. Otherwise, cost[n][m].match_ cost is set to a large value INT_MAX.
2. cost[n][m].ins_cost is computed by taking the minimum between a cost that assumes the operation that produced costs[n][m−1] was an insertion, and a cost assuming the insertion operation is starting a new inserted block.

3. cost[n][m].del_cost is computed by taking the minimum between a cost assuming the operation that produced costs[n−1][m] was a deletion, and a cost assuming the deletion operation is starting a new deleted block.

Finally, after the minimum edit distance is computed, the system works backwards through the costs array starting from the last entry computed, namely costs[s1.length( )][s2.length( )], and traces the sequence of editing operations which produced the minimum edit distance back to the first entry costs[0][0]. During each step in this tracing process, the system can re-compute the minimums to determine which operations were involved in producing the final minimum edit distance.

Variations

A large number of variations to the above-described edit-distance computation are possible. For example, instead of using a dynamic-programming technique, other computational techniques can be used. For example, a recursive technique can be used to compare small documents. However, the computational inefficiency of recursion will make it less practical for comparing larger documents. There also exist a number of heuristic techniques that can be used, such as the technique disclosed in U.S. Pat. No. 7,313,555, entitled Method for Computing the Minimum Edit Distance with Fine Granularity Suitable Quickly" by inventor Peter Klier, filed Apr. 28, 2005 and issued Dec. 25, 2007. Hence, the disclosed embodiments are not meant to be limited to dynamic-programming techniques.

It is also possible to associate different block costs with different types of documents. For example, editing operations are likely to be different for books in comparison to technical papers or computer code, so it may make sense to use a different block cost for each of these different types of documents.

Different users may also perform different types of editing operations. For example, a proofreader may tend to make smaller punctuation-related edits, whereas an editor may be more likely to move around entire paragraphs or sections, so it may make sense to assign different block costs to different types of users.

It may also make sense to assign different costs for changing punctuation marks versus changing normal characters because users are likely to change punctuation marks differently than characters. For example, it may not make sense to assign a single block cost to a block of consecutive punctuation marks that has changed, because it is unlikely that such punctuation marks were changed as a consecutive block.

It may also make sense to assign a different costs to changes in character formatting versus changes in characters. For example, it may make sense to assign a very small cost to changing the formatting of a character, such as bold, italic, underline and font, versus changing the character to a different character. Also, in some cases it may be advantageous not to assign any cost to changes in such character formatting.

The technique can also be adapted to work with tokens for words instead of individual characters. This variation involves first translating each word in the document into a corresponding token and then running a minimum-edit-distance computation on the tokens. This variation charges a specific cost for each block of words that is modified as opposed to charging a cost for each block of characters that is modified.

For computational efficiency reasons, it may make sense to first break up a large document into chapters or sections and then compute edit distances between corresponding chapters or sections. However, if chapters or sections have been added, deleted or moved during the editing process, it may be tricky to determine which chapters or sections to compare.

It is also possible to assign a different cost to each different sized block that has changed. In this case, the technique will need to keep track of the run length of each block to make it possible to assign a different cost for each block size. For example, it may make sense to assign a block cost of 3 for all blocks less than 7 characters in size, and a block cost of 5 for all blocks 7 or greater characters in size.

The technique can also be extended to assigning different costs to: (1) changing a block of characters; (2) changing a word; (3) changing an entire sentence; (4) changing an entire paragraph; and (5) changing an entire chapter. In this case, the minimum-edit-distance computation will need to somehow parse the document to delimit boundaries for words, sentences, paragraphs and chapters.

The above-described technique can also be modified to look for blocks of characters that have moved during a cut-and-paste operation. For example, a fairly small cost can be assigned to moving a large block of characters because the user performs a fairly simple edit operation to move such a block. It may be possible to implement this feature heuristically by comparing blocks that have been deleted with blocks that have been inserted to try to find a match.

Also, the above-described technique can be modified to look for a global replacement of one block of characters for another block of characters. It may make sense to count a global replacement as a single cost as opposed to summing the individual costs of all of the replacements. This can also be accomplished heuristically by comparing blocks of characters that have been replaced to determine whether a global replacement operation has taken place.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for inferring a sequence of editing operations that were applied to a document to produce an updated version of the document, comprising:

determining a minimum edit distance between the document and the updated version of the document;

wherein determining the minimum edit distance involves associating a block cost with each contiguous block of characters that is changed by an editing operation associated with the minimum edit distance;

using information stored while determining the minimum edit distance to determine the sequence of editing operations, including changes to contiguous blocks of characters, which were used to achieve the minimum edit distance;

wherein if the document is a string s1 of length N and the updated version of the document is a string s2 of length M, determining the minimum edit distance involves using a dynamic-programming technique that maintains an N×M array of costs, wherein a given entry costs[n][m] stores minimum edit distances between a prefix of s1 of length n and a prefix of s2 of length m;

wherein the dynamic-programming technique computes minimum edit distances between progressively larger prefixes of s1 and s2 until the minimum edit distance between s1 and s2 is ultimately computed; and wherein each entry in costs[n][m] is computed by taking a minimum of:

costs[n][m−1] plus a character insertion cost that possibly includes a block cost, costs[n−1,m] plus a character deletion cost that possibly includes a block cost, and costs[n−1][m−1] plus a character matching cost which can be zero.

2. The method of claim 1, wherein determining the minimum edit distance additionally involves associating a character cost with each character that is changed by an editing operation associated with the minimum edit distance.

3. The method of claim 1, wherein the minimum edit distance is determined based on a set of editing operations comprising insertions, deletions and replacements of contiguous blocks of one or more characters.

4. The method of claim 1, wherein each entry costs[n][m] includes:
   a minimum cost for the case where the last operation was an insertion;
   a minimum cost for the case where the last operation was a deletion; and
   a minimum cost for the case where the last operation was a match.

5. The method of claim 1,
   wherein the document is a shared document; and
   wherein the method further comprises communicating the sequence of editing operations to a remote version of the document located on a remote computing device, so that the remote computing device can use an operational transformation technique to transform the sequence of editing operations before applying the transformed sequence of editing operations to the remote version of the document.

6. The method of claim 5, wherein the shared document is maintained by an online content management system that uses the method to maintain consistency between different versions of the shared document located on different computing devices.

7. A method for applying editing operations associated with a remote version of a document to a local version of the document, comprising:
   receiving a sequence of editing operations associated with the remote version of the document, wherein the sequence of editing operations was generated while computing a minimum edit distance between the remote version of the document and an updated remote version of the document, wherein during the minimum edit distance computation a block cost is associated with each contiguous block of characters that is changed by an editing operation and a character cost with each character that is changed by an editing operation;
   using an operational transformation technique to transform the received sequence of editing operations; and
   applying the transformed sequence of editing operations to the local version of the document;
   wherein if the remote version of the document is a string s1 of length N and the updated remote version of the document is a string s2 of length M, computing the minimum edit distance involves using a dynamic-programming technique that maintains an N×M array of costs, wherein a given entry costs[n][m] stores minimum edit distances between a prefix of s1 of length n and a prefix of s2 of length m;
   wherein the dynamic-programming technique computes minimum edit distances between progressively larger prefixes of s1 and s2 until the minimum edit distance between s1 and s2 is ultimately computed; and wherein each entry in costs[n][m] is computed by taking a minimum of:
   costs[n][m−1] plus a character insertion cost that possibly includes a block cost,
   costs[n−1,m] plus a character deletion cost that possibly includes a block cost, and
   costs[n][m−1] plus a character matching cost which can be zero.

8. The method of claim 7, wherein the minimum edit distance is computed based on a set of editing operations comprising insertions, deletions and replacements of contiguous blocks of one or more characters.

9. The method of claim 7, wherein the document is maintained by an online content management system that uses the method to maintain consistency between different versions of the document located on different computing devices.

10. A non-transitory computer-readable storage medium storing instructions that when executed by a computer cause the computer to perform a method for inferring a sequence of editing operations that were applied to a document to produce an updated version of the document, the method comprising:
   determining a minimum edit distance between the document and the updated version of the document;
   wherein determining the minimum edit distance involves associating a block cost with each contiguous block of characters that is changed by an editing operation associated with the minimum edit distance;
   using information stored while determining the minimum edit distance to determine the sequence of editing operations, including changes to contiguous blocks of characters, which were used to achieve the minimum edit distance;
   wherein if the document is a string s1 of length N and the updated version of the document is a string s2 of length M, determining the minimum edit distance involves using a dynamic-programming technique that maintains an N×M array of costs, wherein a given entry costs[n][m] stores minimum edit distances between a prefix of s1 of length n and a prefix of s2 of length m;
   wherein the dynamic-programming technique computes minimum edit distances between progressively larger prefixes of s1 and s2 until the minimum edit distance between s1 and s2 is ultimately computed; and
   wherein each entry in costs[n][m] is computed by taking a minimum of:
   costs[n][m−1] plus a character insertion cost that possibly includes a block cost, costs[n−1,m] plus a character deletion cost that possibly includes a block cost, and costs[n−1][m−1] plus a character matching cost which can be zero.

11. The non-transitory computer-readable storage medium of claim 10, wherein determining the minimum edit distance additionally involves associating a character cost with each character that is changed by an editing operation associated with the minimum edit distance.

12. The non-transitory computer-readable storage medium of claim 10, wherein the minimum edit distance is determined based on a set of editing operations comprising insertions, deletions and replacements of contiguous blocks of one or more characters.

13. The non-transitory computer-readable storage medium of claim 10, wherein each entry costs[n][m] includes:
   a minimum cost for the case where the last operation was an insertion;
   a minimum cost for the case where the last operation was a deletion; and a minimum cost for the case where the last operation was a match.

14. The non-transitory computer-readable storage medium of claim 10,
wherein the document is a shared document; and
wherein the method further comprises communicating the sequence of editing operations to a remote version of the document located on a remote computing device, so that the remote computing device can use an operational transformation technique to transform the sequence of editing operations before applying the transformed sequence of editing operations to the remote version of the document.

15. The non-transitory computer-readable storage medium of claim 14, wherein the shared document is maintained by an online content management system that uses the method to maintain consistency between different versions of the shared document located on different computing devices.

16. A non-transitory computer-readable storage medium storing instructions that when executed by a computer cause the computer to perform a method for applying editing operations associated with a remote version of a document to a local version of the document, the method comprising:
receiving a sequence of editing operations associated with the remote version of the document, wherein the sequence of editing operations was generated while computing a minimum edit distance between the remote version of the document and an updated remote version of the document, wherein during the minimum edit distance computation a block cost is associated with each contiguous block of characters that is changed by an editing operation and a character cost with each character that is changed by an editing operation;
using an operational transformation technique to transform the received sequence of editing operations; and
applying the transformed sequence of editing operations to the local version of the document;
wherein if the remote version of the document is a string s1 of length N and the updated remote version of the document is a string s2 of length M, computing the minimum edit distance involves using a dynamic-programming technique that maintains an N×M array of costs, wherein a given entry costs[n][m] stores minimum edit distances between a prefix of s1 of length n and a prefix of s2 of length m;
wherein the dynamic-programming technique computes minimum edit distances between progressively larger prefixes of s1 and s2 until the minimum edit distance between s1 and s2 is ultimately computed; and
wherein each entry in costs[n][m] is computed by taking a minimum of:
costs[n][m−1] plus a character insertion cost that possibly includes a block cost, costs[n−1,m] plus a character deletion cost that possibly includes a block cost, and costs[n−1][m−1] plus a character matching cost which can be zero.

17. The non-transitory computer-readable storage medium of claim 16, wherein the minimum edit distance is computed based on a set of editing operations comprising insertions, deletions and replacements of contiguous blocks of one or more characters.

18. The non-transitory computer-readable storage medium of claim 16, wherein the document is maintained by an online content management system that uses the method to maintain consistency between different versions of the document located on different computing devices.

19. A system that infers a sequence of editing operations that were applied to a document to produce an updated version of the document, comprising:
at least one processor;
a memory coupled to the at least one processor; and
an application stored in the memory and configured to,
determine a minimum edit distance between the document and the updated version of the document;
wherein determining the minimum edit distance involves associating a block cost with each contiguous block of characters that is changed by an editing operation associated with the minimum edit distance;
use information stored while determining the minimum edit distance to determine the sequence of editing operations, including changes to contiguous blocks of characters, which were used to achieve the minimum edit distance;
wherein if the document is a string s1 of length N and the updated version of the document is a string s2 of length M, determining the minimum edit distance involves using a dynamic-programming technique that maintains an N×M array of costs, wherein a given entry costs[n][m] stores minimum edit distances between a prefix of s1 of length n and a prefix of s2 of length m;
wherein the dynamic-programming technique computes minimum edit distances between progressively larger prefixes of s1 and s2 until the minimum edit distance between s1 and s2 is ultimately computed; and
wherein each entry in costs[n][m] is computed by taking a minimum of: costs[n][m−1] plus a character insertion cost that possibly includes a block cost, costs[n−1,m] plus a character deletion cost that possibly includes a block cost, and costs[n−1][m−1] plus a character matching cost which can be zero.

20. The system of claim 19, wherein determining the minimum edit distance additionally involves associating a character cost with each character that is changed by an editing operation associated with the minimum edit distance.

21. The system of claim 19, wherein the minimum edit distance is determined based on a set of editing operations comprising insertions, deletions and replacements of contiguous blocks of one or more characters.

22. The system of claim 19, wherein each entry costs[n][m] includes:
a minimum cost for the case where the last operation was an insertion;
a minimum cost for the case where the last operation was a deletion; and
a minimum cost for the case where the last operation was a match.

23. The system of claim 22,
wherein the document is a shared document; and
wherein the application is further configured to communicate the sequence of editing operations to a remote version of the document located on a remote computing device, so that the remote computing device can use an operational transformation technique to transform the sequence of editing operations before applying the transformed sequence of editing operations to the remote version of the document.

24. The system of claim 23, further comprising an online content management system that interacts with the system to maintain consistency between different versions of the shared document located on different computing devices.

25. A system that applies editing operations associated with a remote version of a document to a local version of the document, comprising:
- at least one processor;
- a memory coupled to the at least one processor; and
- an application stored in the memory and configured to,
  - receive a sequence of editing operations associated with the remote version of the document, wherein the sequence of editing operations was generated while computing a minimum edit distance between the remote version of the document and an updated remote version of the document, wherein during the minimum edit distance computation a block cost is associated with each contiguous block of characters that is changed by an editing operation and a character cost with each character that is changed by an editing operation;
  - use an operational transformation technique to transform the received sequence of editing operations; and
  - apply the transformed sequence of editing operations to the local version of the document;
  - wherein if the remote version of the document is a string s1 of length N and the updated remote version of the document is a string s2 of length M, computing the minimum edit distance involves using a dynamic-programming technique that maintains an N×M array of costs, wherein a given entry costs[n][m] stores minimum edit distances between a prefix of s1 of length n and a prefix of s2 of length m;
  - wherein the dynamic-programming technique computes minimum edit distances between progressively larger prefixes of s1 and s2 until the minimum edit distance between s1 and s2 is ultimately computed; and
  - wherein each entry in costs[n][m] is computed by taking a minimum of: costs[n−n][m−1] plus a character insertion cost that possibly includes a block cost, costs[n−1,m] plus a character deletion cost that possibly includes a block cost, and costs[n−1][m−1] plus a character matching cost which can be zero.

26. The system of claim 25, wherein the minimum edit distance is computed based on a set of editing operations comprising insertions, deletions and replacements of contiguous blocks of one or more characters.

27. The system of claim 25, wherein the document is maintained by an online content management system that uses the method to maintain consistency between different versions of the document located on different computing devices.

* * * * *